Oct. 6, 1925.
A. A. LOCKWOOD
1,556,449
PROCESS FOR TREATING TIN ORES, CONCENTRATES, TAILINGS OR THE LIKE
Filed April 9, 1923
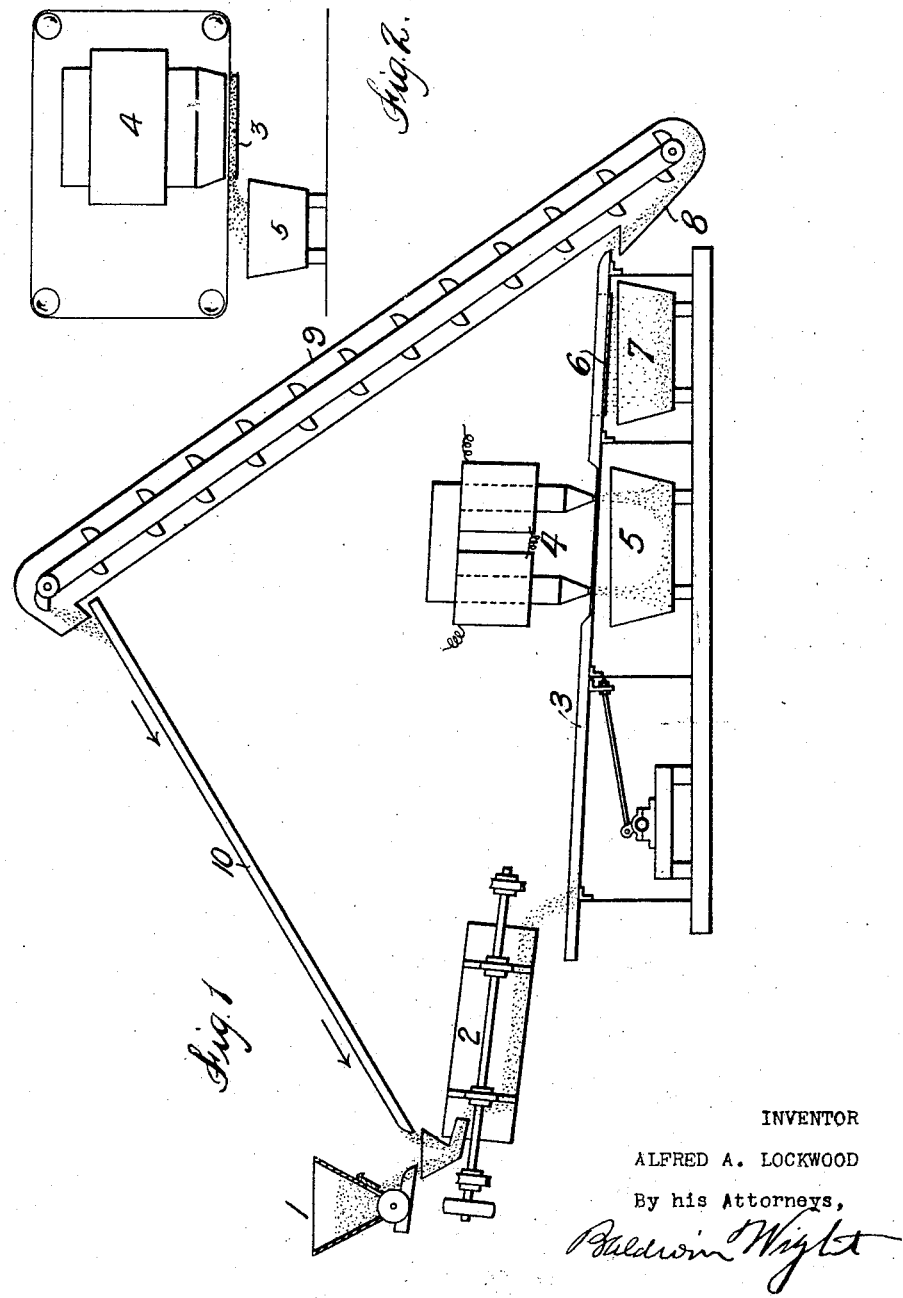
INVENTOR
ALFRED A. LOCKWOOD
By his Attorneys, Patented Oct. 6, 1925.

1,556,449

UNITED STATES PATENT OFFICE.

ALFRED ARTHUR LOCKWOOD, OF MERTON, LONDON, ENGLAND.

PROCESS FOR TREATING TIN ORES, CONCENTRATES, TAILINGS, OR THE LIKE.

Application filed April 9, 1923. Serial No. 630,935.

*To all whom it may concern:*

Be it known that I, ALFRED ARTHUR LOCKWOOD, a subject of the King of Great Britain, residing at Woodford Lodge, Merton, London, England, have invented a new and useful Improved Process for Treating Tin Ores, Concentrates, Tailings, or the like, of which the following is a specification.

This invention relates to an improved process for treating tin ores and concentrates.

Previous attempts have been made to apply magnetic separation processes to tin ores but such attempts have been abandoned owing to the serious loss entailed in the non-magnetic particles.

According to this invention the magnetically separated concentrate of a tin ore, which is magnetic or which has been roasted to render certain of its constituents magnetic, is, before undergoing a second magnetic separation, mixed with a suitable non-magnetic substance whose particles differ in size from that of the non-magnetic particles in the concentrate, the residues derived from the magnetic separation being thereupon screened to separate the admixed particles from the non-magnetic content of the concentrate.

In the application of this process to tin hæmatite ores, for example, the roasting process is, as has indeed previously been proposed, carried out in a reducing atmosphere and in such a manner as to transform the iron content into magnetite. The ore is now subjected either to a wet or dry magnetic separation whereupon the magnetic values are crushed to —100 mesh, thoroughly admixed with sand graded to +60 mesh and again subjected to a magnetic separation. The product passing away as tailings from the magnet is dropped on a shaking screen of 60 mesh to the lineal inch, thereby separating the tin content from the sand which of course is available for admixture with another batch of concentrate.

In order that a small quantity of sand may be employed in treating a large tonnage of concentrate there may be a continuous return of sand separated at the tail of the extractor to the head of the extractor where it is again mixed with the concentrate.

*Example.*—A tin concentrate containing 20% of specular iron ($Fe_2O_3$) was mixed with 4% of fine coal and heated in the reducing atmosphere of an ordinary reverberatory furnace until the iron was superficially reduced to the magnetic state whereupon it was passed under a magnet and the iron was thereby extracted: this concentration which assayed 12% Sn was now crushed to minus 100 mesh and thoroughly mixed with four times its weight of sand screened plus 60 mesh; the mixture was passed under a magnet and the magnetic product extracted; the residue was screened; this magnetic product was again mixed with sand and again passed under a magnet; the product extracted assayed 1% Sn.

In the drawings Figure 1 is a diagrammatic side elevation of an apparatus for carrying out the invention.

Figure 2 is a diagrammatic end view of a portion of the same taken at right angles to the view of Figure 1.

There is illustrated a hopper 1 to which the ore to be treated is fed. 2 is a trommel agitator, 3 a conveyor tray, 4 an electromagnet, 5 a receiver for the magnetic material, 6 a screen of a mesh adapted to allow the non-magnetic content of the ore to pass through while retaining the admixed non-magnetic particles. 7 is a receiver for the non-magnetic content of the ore, 8 a boot of an elevator 9, receiving the admixed non-magnetic particles, and 10 a chute returning the particles to trommel 2.

As shown in Figure 2 an endless band preferably of thin rubber is mounted to be driven between the electromagnet and the conveyor 3. The magnetic particles are caused to adhere temporarily to the band but as soon as this passes to one side out of the range of the magnetic force these particles drop into the receiver 5. Since the particular apparatus forms no part of the invention the illustration is merely diagrammatic.

What I claim is:—

In the treatment of suitable stanniferous material, roasting the stanniferous material in a manner to render certain of its constituents magnetic, subjecting the roasted ore or concentrate to magnetic separation, crushing the magnetic values and admixing them with a non-magnetic substance such as sand, whose particles are larger than the particles of the tin content, again subjecting to a magnetic separation and treating the residues to separate the admixed particles from the tin content.

In testimony that I claim the foregoing as my invention I have signed my name this 26th day of March, 1923.

ALFRED ARTHUR LOCKWOOD.